United States Patent
Carlson et al.

(10) Patent No.: US 7,490,144 B2
(45) Date of Patent: Feb. 10, 2009

(54) DISTRIBUTED NETWORK MANAGEMENT SYSTEM AND METHOD

(75) Inventors: John Carlson, Seattle, WA (US); Tim Hinderliter, Seattle, WA (US); Leigh Metcalf, Seattle, WA (US)

(73) Assignee: Internap Network Services Corporation, Seattle, WA (US)

( * ) Notice: Subject to any disclaimer, the term of this patent is extended or adjusted under 35 U.S.C. 154(b) by 724 days.

(21) Appl. No.: 10/790,156

(22) Filed: Mar. 1, 2004

(65) Prior Publication Data

US 2004/0210632 A1      Oct. 21, 2004

Related U.S. Application Data

(62) Division of application No. 09/609,180, filed on Jun. 30, 2000, now abandoned.

(51) Int. Cl.
*G06F 15/173* (2006.01)
(52) U.S. Cl. ..................................... 709/223
(58) Field of Classification Search ................. 709/223, 709/220; 714/6, 13, 7, 15
See application file for complete search history.

(56) References Cited

U.S. PATENT DOCUMENTS

| | | | |
|---|---|---|---|
| 5,710,885 A | | 1/1998 | Bondi |
| 5,948,108 A | | 9/1999 | Lu et al. |
| 6,173,311 B1 | * | 1/2001 | Hassett et al. ................ 709/202 |
| 6,338,092 B1 | * | 1/2002 | Chao et al. ................... 709/236 |
| 6,389,459 B1 | * | 5/2002 | McDowell ................... 709/216 |
| 6,453,468 B1 | * | 9/2002 | D'Souza ...................... 717/168 |
| 6,564,336 B1 | * | 5/2003 | Majkowski ..................... 714/4 |
| 7,028,083 B2 | * | 4/2006 | Levine et al. ................ 709/223 |

* cited by examiner

*Primary Examiner*—David Y Eng
(74) *Attorney, Agent, or Firm*—Kilpatrick Stockton LLP

(57) ABSTRACT

A distributed network management system and method of operation. The system includes at least one hub server and at least one remote server, where the hub server and the remote server communicate with each other. The remote server additionally communicates with and monitors one or more network devices. In the event that the remote server becomes inoperational, the hub server assumes monitoring of the network device. For redundancy, primary and secondary hub servers can be provided, wherein the primary and secondary hub servers communicate with each other and are capable of communicating with the remote server. For further redundancy, primary and secondary remote servers can be provided, wherein the primary and secondary remote servers communicate with each other but independently monitor the network devices. In the peered remote configuration, the hub server is capable of communicating with either of the remote servers. Where both the hub servers and the remote servers are peered, each hub server is capable of communicating with each remote server.

13 Claims, 13 Drawing Sheets

DISTRIBUTED NETWORK MANAGEMENT SYSTEM AND METHOD

CROSS-REFERENCE TO RELATED APPLICATIONS

This application is a divisional of U.S. patent application Ser. No. 09/609,180 entitled "Distributed Network Management System and Method" filed Jun. 30, 2000, now abandoned, which is incorporated by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to network communications, and more particularly to monitoring and managing network performance.

2. Description of the Background Art

In the operation of interconnected networks, it is often desirable to have a mechanism for monitoring the state of equipment and devices in the network. Traditionally, this has been accomplished using a centrally-based network management system, with a plurality of individual network management systems feeding up to the central network management system in a conventional tree hierarchy. Equipment and devices would similarly feed up to the individual network management systems in a conventional tree hierarchy. Unfortunately, such a architecture for a network management system does not scale well and does not provide for propagation of state and configuration information among a set of cooperating systems.

BRIEF SUMMARY OF THE INVENTION

The present invention is a scalable distributed network management system with the potential for full redundancy at hub and remote levels. The remotes monitor state changes of network devices, and those state changes propagate bidirectionally between hubs and remotes. Furthermore, configuration changes for designating the monitoring parameters of the remotes propagate bidirectionally between remotes and hubs.

By way of example, and not of limitation, the system includes at least one hub server and at least one remote server, where the hub server and the remote server communicate with each other. The remote server additionally communicates with and monitors one or more network devices. In the event that the remote server becomes inoperational, the hub server assumes monitoring of the network device(s).

According to another aspect of the invention, for redundancy, primary and secondary hub servers can be provided, wherein the primary and secondary hub servers communicate with each other. In this peered hub configuration, if the primary hub server becomes inoperational and the secondary hub server is operational, the secondary hub server communicates with the remote server. Additionally, in the peered hub configuration, if both the primary hub server and the remote server are inoperational, the secondary hub server assumes monitoring of the network devices.

According to another aspect of the invention, for redundancy, primary and secondary remote servers can be provided, wherein the primary and secondary remote servers communicate with each other but independently monitor the network devices. In the peered remote configuration, if the primary remote server becomes inoperational, the primary hub communicates with the secondary remote.

According to a still further aspect of the invention, if the remotes and the hubs are peered and the primary hub is inoperational, the secondary hub communicates with the primary remote thereby temporarily assuming the duties of the primary hub. Also in the peered hub and peered remote configuration, if both the primary hub and primary remote are inoperational, the secondary hub communicates with the secondary remote. If both remotes are inoperational, then all active hubs assume monitoring of the network devices.

To facilitate monitoring of network devices, the invention derives state information from network devices using what is referred to herein as the Leigh/Tim Paradigm or LTP. In LTP, a plurality of pings is sent from an ICMP server to an interface address on a network device during a polling interval. The number of pings returned from said network device is recorded and converted to a percentage based on the ratio of the number of pings sent to the number of pings received. Next, an SNMP query is sent to the network device and the operational status of the network device, such as "up", "down" or "unknown" is determined from the SNMP query. Using the percentage of pings returned and the SNMP status, a status percentage for the polling period is generated by multiplying the percentage pings returned by a constant associated with the operational status, where the constant has a first value if the operational status is "up", a second value if the operational status is down", and a third value if the operational status is "unknown". Next, a weighted average of the status percentages for the current and previous four polling periods is computed. Then, the state of the network device is determined from the weighted average.

An object of the invention is to provide a distributed network management system where configuration information propagates bidirectionally through the system.

Another object of the invention is to provide a distributed network management system where configuration information can be entered at one location and propagate through the system.

Another object of the invention is to provide a distributed network management system which can be accessed through a web server.

Another object of the invention is to provide a distributed network management system where state changes propagate bidirectionally through the system.

Another object of the invention is to provide a peered distributed network management system with automatic failover and resynchronization.

Another object of the invention is to provide a distributed network management system which consolidates multiple status notifications into a single notification one based on an interface hierarchy.

Another object of the invention is to provide a distributed network management system with a plug-in architecture of service, notification and utility modules.

Another object of the invention is to provide a distributed network management system that can serve as an information transport.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the components, system and methods generally shown in FIG. 1 through FIG. 14. It will be appreciated that the invention may vary as to configuration and details without departing from the basic concepts as disclosed herein.

Figure 1:
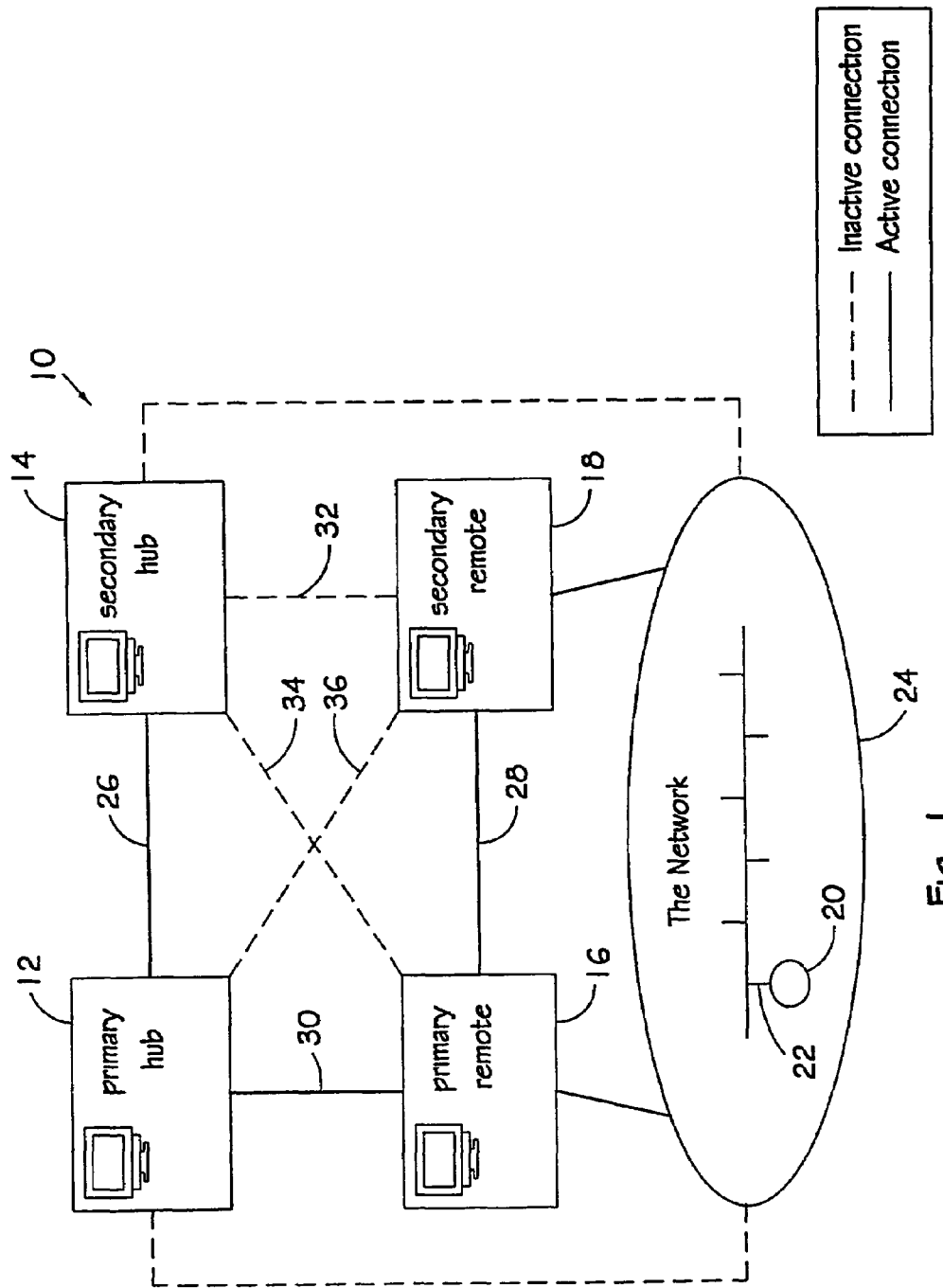
FIG. 1 is a schematic diagram of the high level architecture of an embodiment of a distributed network management system according to the invention depicting the primary hub and the primary remote as being operational, and the primary hub as communicating with the primary remote.

FIG. 1 is a schematic diagram of the high level architecture 10 of an embodiment of a distributed network management system according to the present invention. In the embodiment shown, the system comprises a primary hub 12 and a secondary hub 14, both of which can communicate with a primary remote 16 and a secondary remote 18. The remotes in turn communicate with a specific set of devices 20 on nodes 22 of the network 24, such as routers, to monitor network status. The network may be all or a portion of the Internet or other wide area network. The set of network devices is selected to provide an overall representation of the network being monitored.

Each hub is in active communication with the other hub through a full-time communications link 26 for redundancy, so that data received from one hub is continuously propagated to the other. Similarly, each remote is in active communication with the other remote through a full-time communications link 28 for redundancy and for continuously propagating data to the other remote. In addition, each remote is in constant communication with each network device. However, each remote preferably monitors the network devices independent of the other remote. As a result, the data acquired by a remote may disagree with the data acquired by the other remote, even though both remotes are monitoring the same network devices. Because the remotes operate independently of each other, the monitoring times could be different and a particular remote may observe a network condition that was not observed by the other remote. For example, one remote may monitor conditions thirty seconds into each minute, while another remote may monitor conditions forty-five seconds into each minute.

Primary hub 12 is in full-time communication with primary remote 16 through communication link 30 so that changes detected by primary remote 16 is continuously propagated to primary hub 12 as well as to secondary hub 14 through primary hub 12. In addition, configuration data such as which network devices to monitor can be propagated to primary remote 16 and to secondary remote 18 through primary remote 16. Note, however, that there is also a normally inactive communication link 32 between secondary hub 14 and secondary remote 18, a normally inactive communications link 34 between secondary hub 14 and primary remote 16, and a normally inactive communications link 36 between primary hub 12 and secondary remote 18. These communications links are not necessarily direct physical links, however. In the preferred embodiment of the invention, each remote and network device has an address, such as an Internet Protocol (IP) address. This allows the remote or network device to be accessed over a network such as, for example, the Internet. In addition, each hub can communicate directly with a network device as well.

With the architecture described above, the preferred communications hierarchy is as follows:

1. if the primary hub and the primary remote are operational, the primary hub communicates with the primary remote as shown in FIG. 1.

Figure 2:
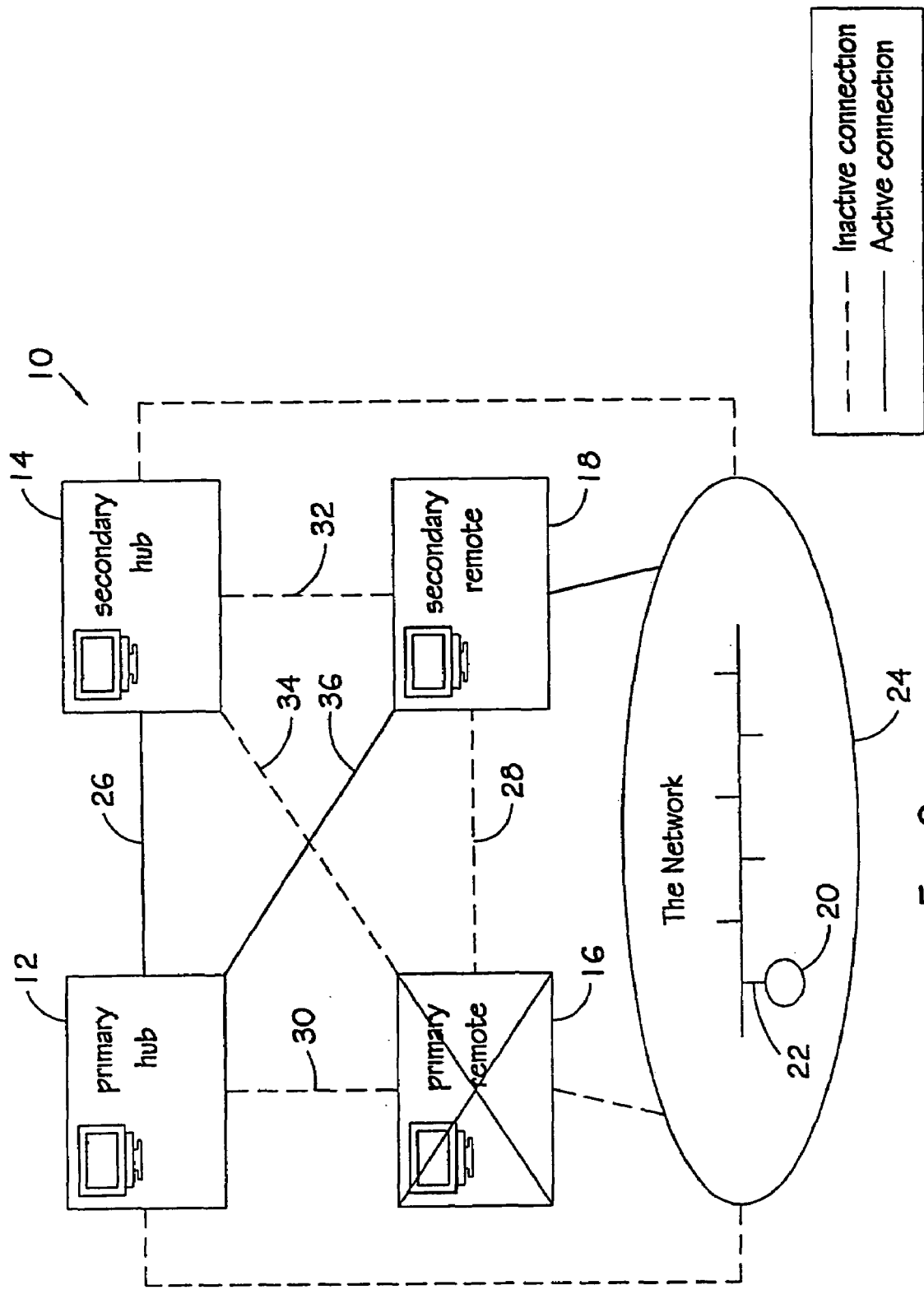
FIG. 2 is a schematic diagram of the distributed network management system of FIG. 1 depicting the primary hub as being operational, the primary remote as being inoperational, the secondary remote as being operational, and the primary hub communicating with the secondary remote.

2. if the primary hub is operational, the primary remote is inoperational, and the secondary remote is operational, the primary hub communicates with the secondary remote as shown in FIG. 2.

Figure 3:
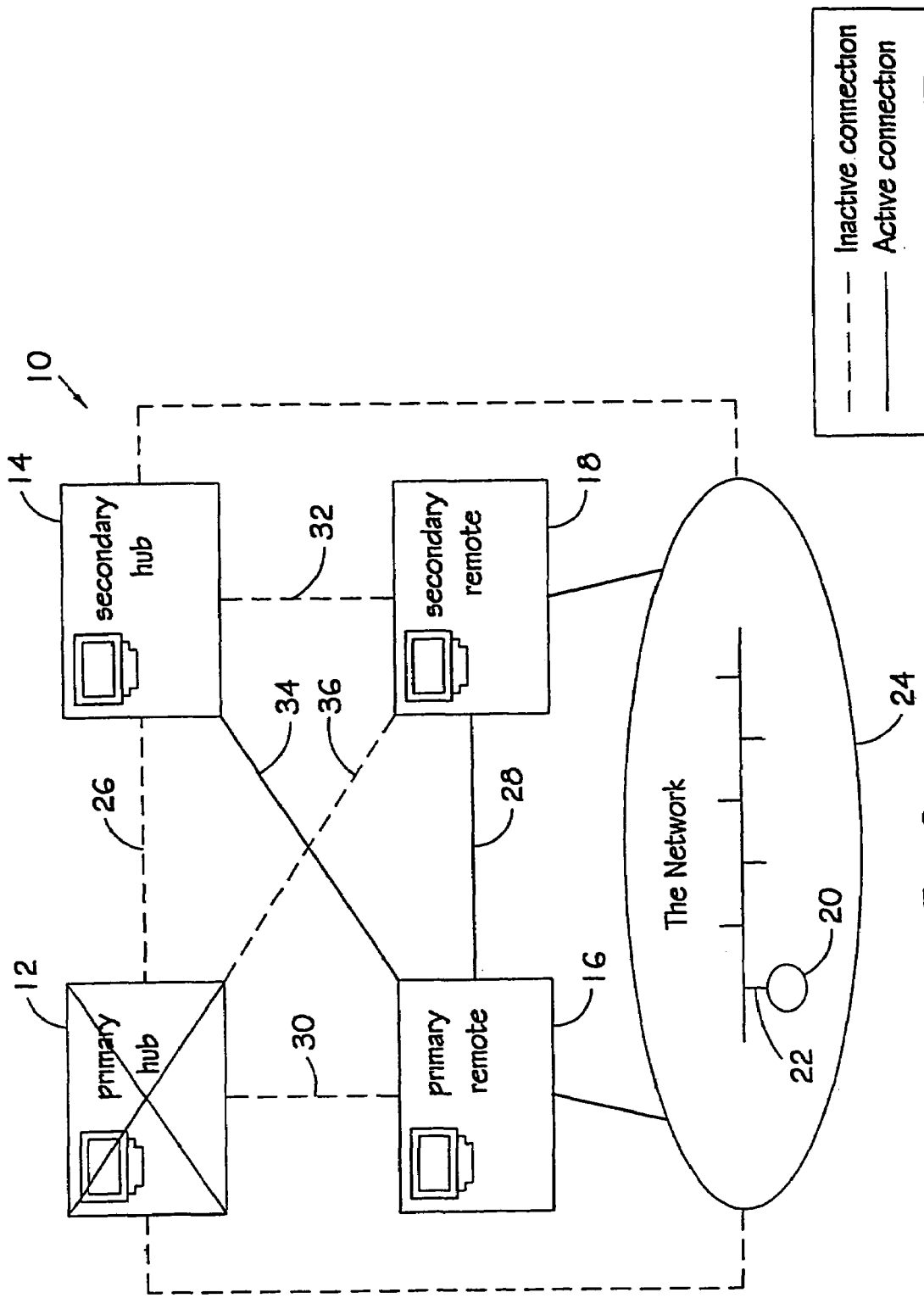
FIG. 3 is a schematic diagram of the distributed network management system of FIG. 1 depicting the primary hub as being inoperational, the secondary hub as being operational, the primary remote as being operational, and the secondary hub communicating with the primary remote.

3. if the primary hub is inoperational, the secondary hub is operational, and the primary remote is operational, the secondary hub communicates with the primary remote as shown in FIG. 3.

Figure 4:
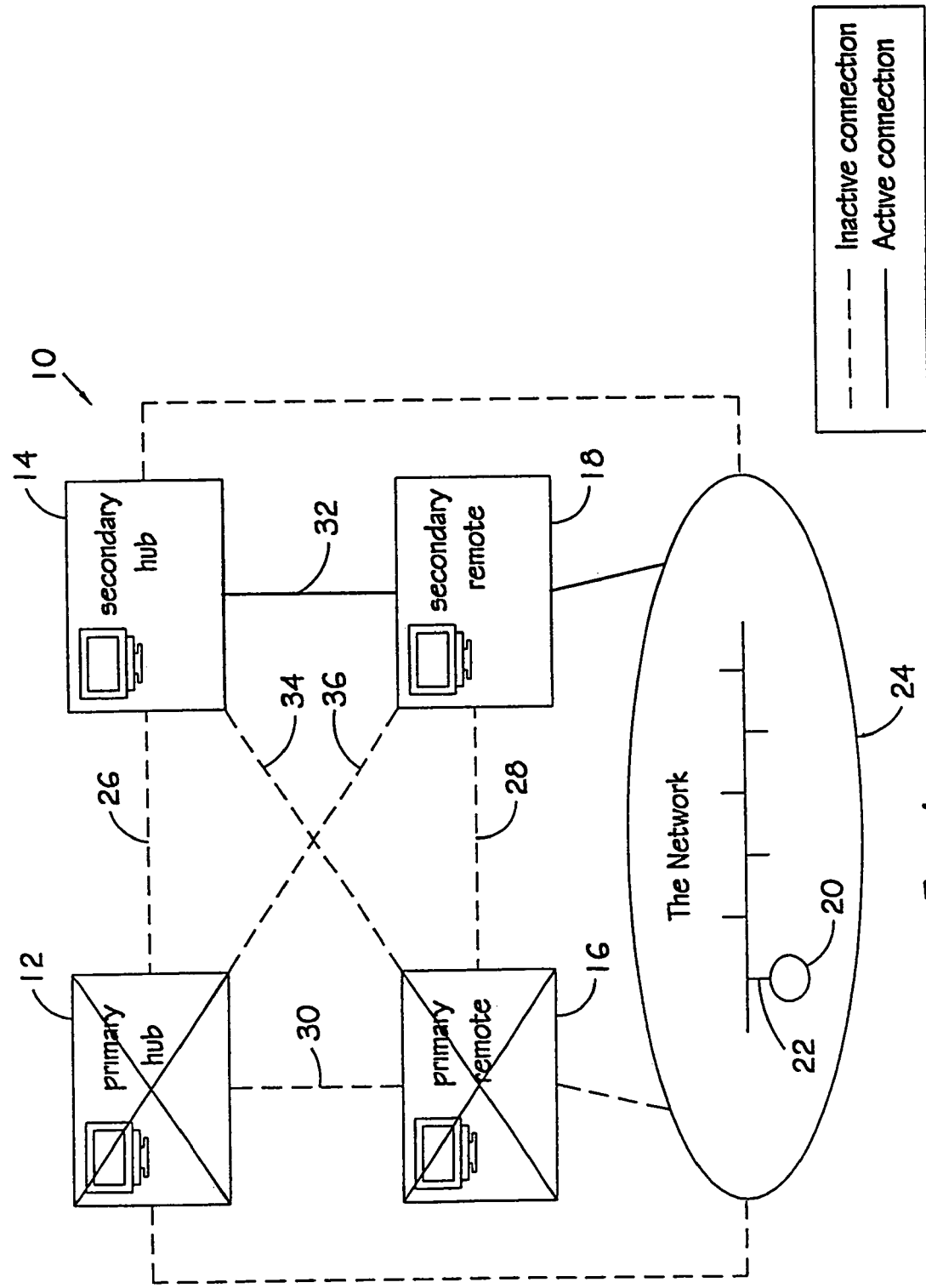
FIG. 4 a schematic diagram of the distributed network management system of FIG. 1 depicting the primary hub as being inoperational, the secondary hub as being operational, the primary remote as being inoperational, the secondary remote as being operational, and the secondary hub communicating with the secondary remote.

4. if the primary hub is inoperational, the secondary hub is operational, the primary remote is inoperational, and the secondary remote is operational, the secondary hub communicates with the secondary remote as shown in FIG. 4.

Figure 5:
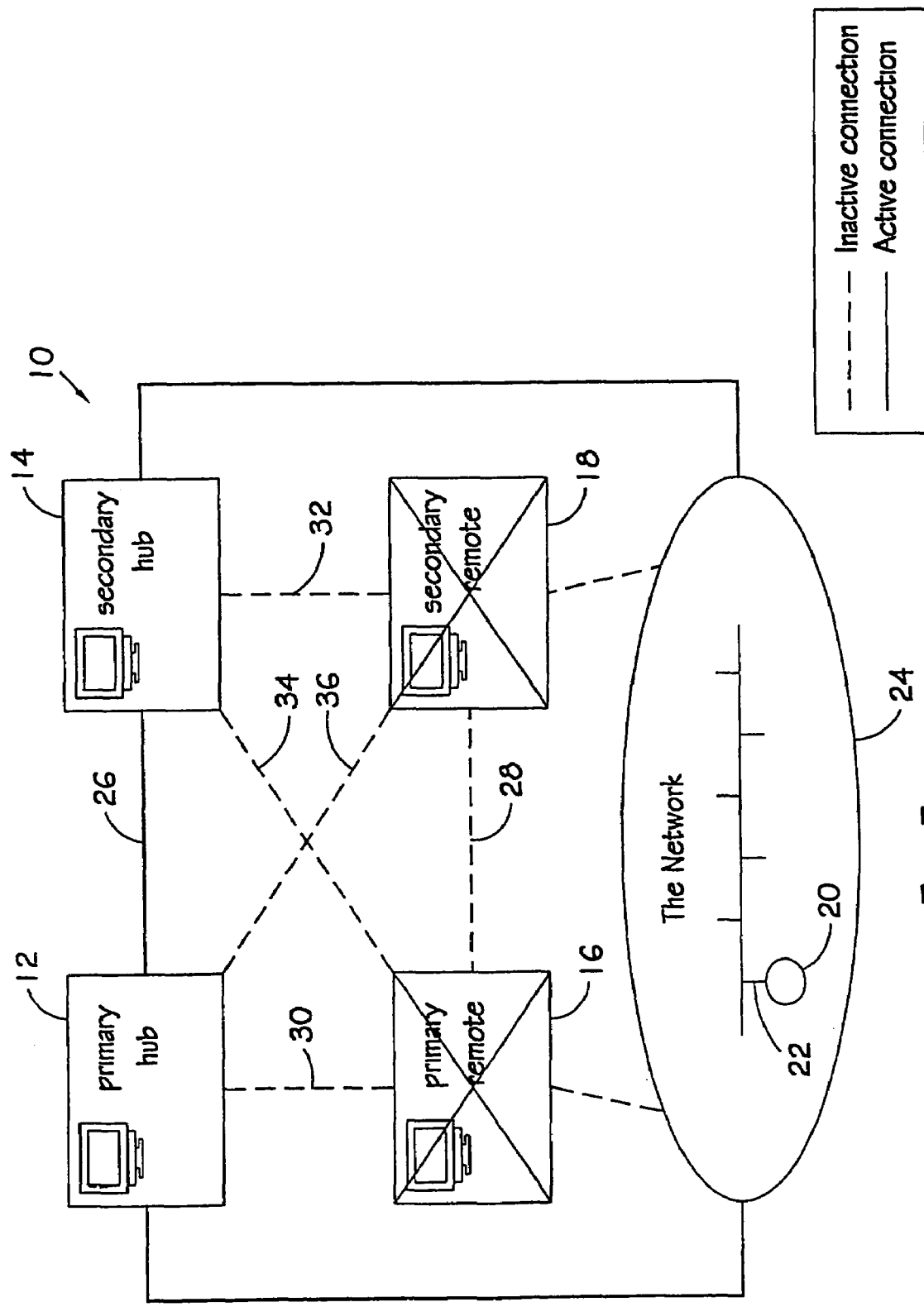
FIG. 5 is a schematic diagram of the distributed network management system of FIG. 1 depicting the primary and secondary remotes as being inoperational, and the primary and secondary hubs communicating with the network devices.

5. if both the primary and secondary remotes are inoperational, all active hubs assume monitoring of the remote network as shown in FIG. 5.

Figure 6:
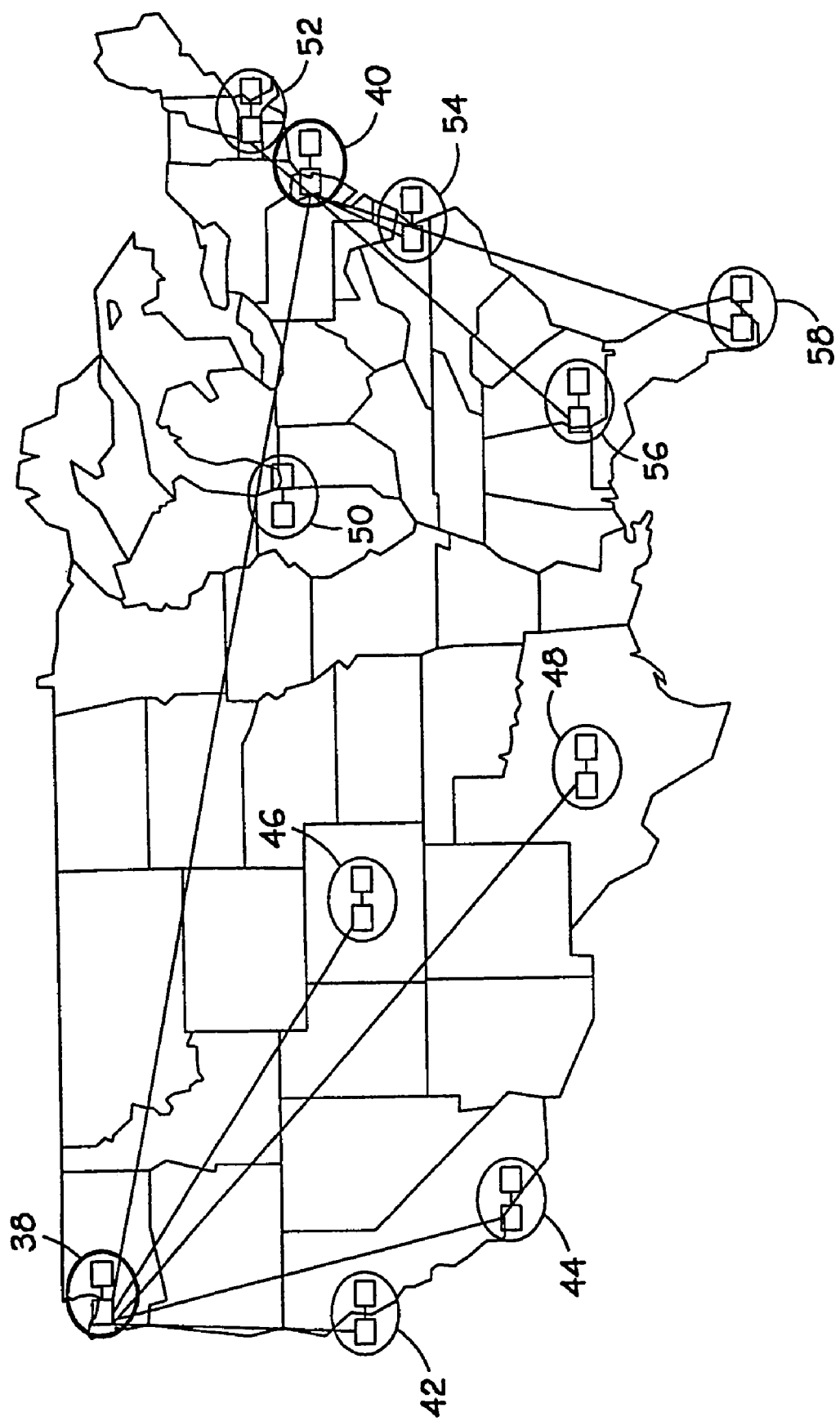
FIG. 6 is a schematic diagram of an implementation of a distributed network management system according to the invention.
Figure 7:
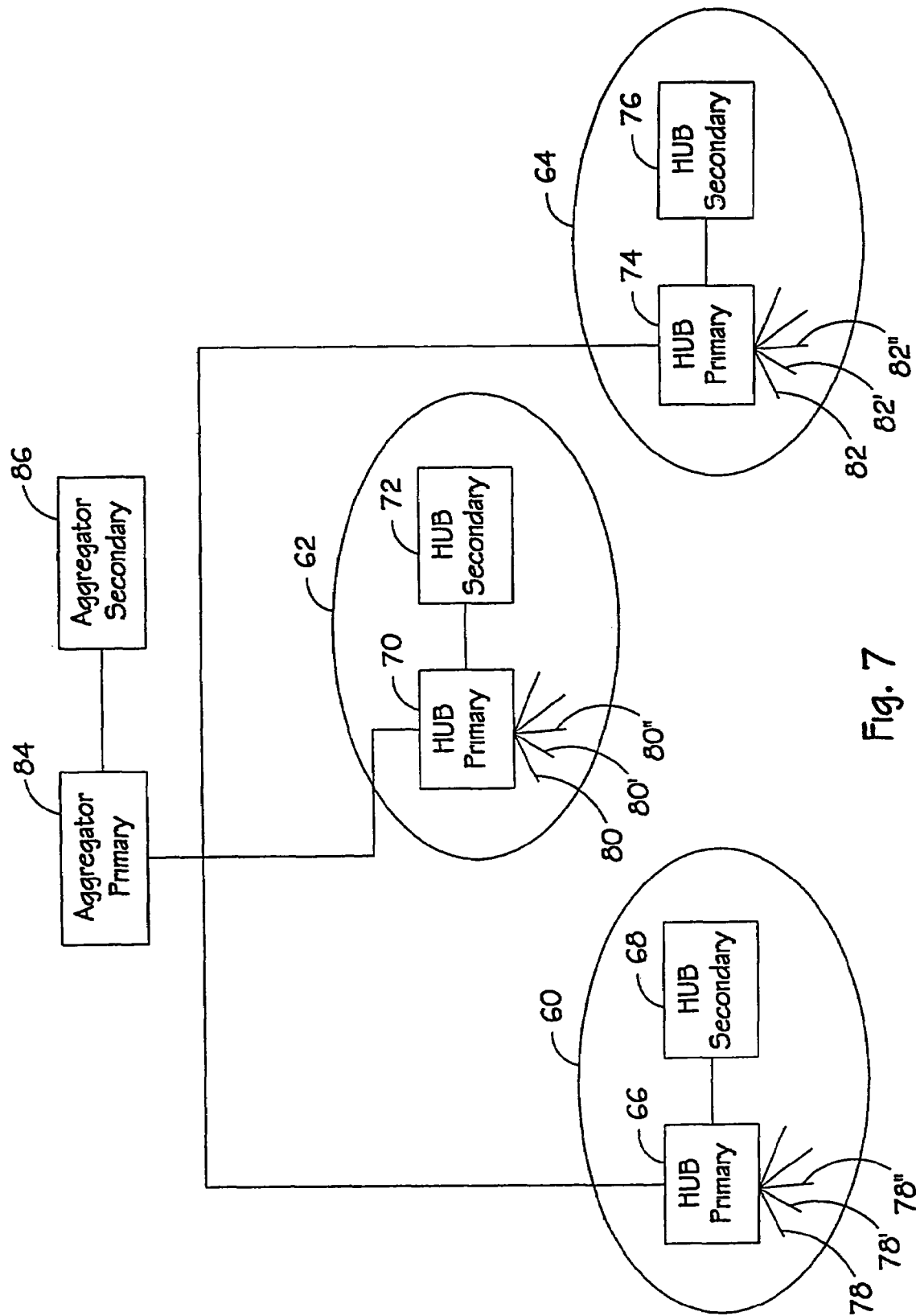
FIG. 7 is schematic diagram showing an alternative embodiment of the distributed network management system implementation of FIG. 6 wherein hubs are regionalized.

Referring now to FIG. 6, an example of a possible geographical configuration of a distributed network management system according to the invention is shown. In FIG. 6, a first set of hubs 38 is shown located in the vicinity of Seattle and a second set of hubs 40 is shown located in the vicinity of New York City. Also shown are several sets of remotes 42, 44, 46, 48, 50, 52, 54, 56, and 58, each of which monitors a portion of the overall network. Note that hubs 38 monitor remotes 42, 44, 46, and 48, while hubs 40 monitor remotes 50, 52, 54, 56, and 58. A change of state monitored by, for example, remotes 50 will propagate to hubs 40 in New York City, and from hubs 40 to sister hubs 38 in Seattle so that both sets of hubs have the same state information.

While the foregoing configuration is scalable, the addition of a larger number of remotes or hubs can become more complex than necessary. In that event, an additional monitoring layer can be added above the hubs. In this way, not only are remotes assigned to regions of the network, but hubs are assigned to regions of the network as well. For example, referring to FIG. 7, three regions 60, 62 and 64 are shown. Each region would include a primary and secondary hub that would be responsible for that region. For example, primary hub 66 and secondary hub 68 would be responsible for region 60, primary hub 70 and secondary hub 72 would be responsible for region 62, and primary hub 74 and secondary hub 76 would be responsible for region 64. In turn the hubs in a particular region would be responsible for several sets of primary and secondary remotes in that region, such as set 78, 78', 78" . . . in region 60, set 80, 80', 80" . . . in region 62, and set 82, 82' and 82" in region 64, and each set of remotes would be responsible for a portion of the network devices therein. The data collected by the primary hubs in each region would be propagated to a primary hub aggregator 84, which in turn would propagate the data to a secondary hub aggregator 86 for redundancy. In this way, a multi-level distributed system architecture can be achieved.

Figure 8:
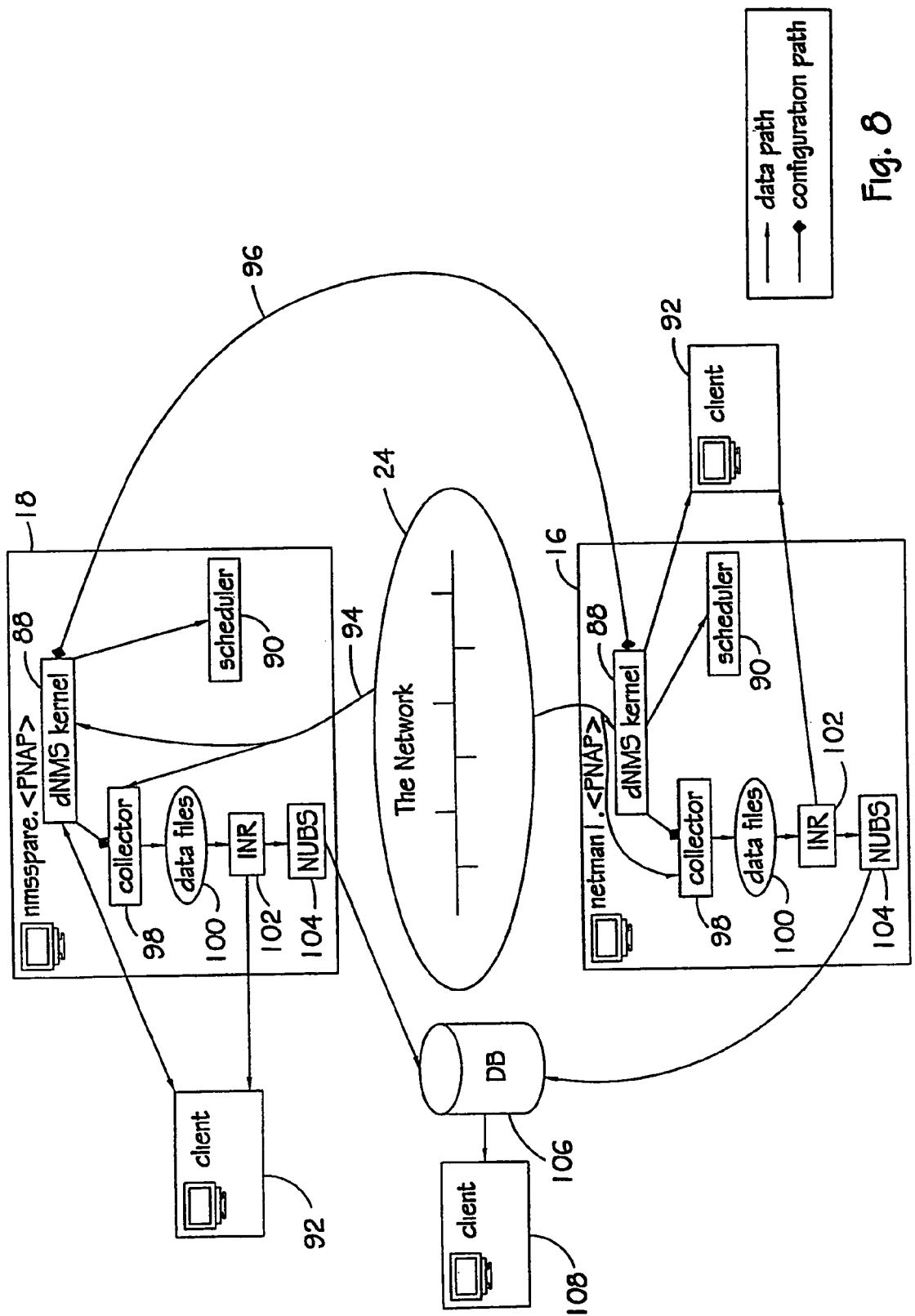
FIG. 8 is a functional block diagram of the internal architecture of a remote according to the present invention.

Referring now to FIG. 1 and FIG. 8, an embodiment of the internal architecture of primary 16 and secondary 18 remote is shown. Each remote includes a dNMS kernel 88 that, in addition to other functions that will be described, acquires data from the network 24. Also shown is a scheduler 90, which is a plug-in service that notifies administrative personnel that a problem exists on the network being monitored.

Each remote is accessible through a client terminal 92 running a browser-based application interface. Note that data propagates from the network to each dNMS kernel through a data path 94, and that configuration changes received from a hub (not shown) propagates to each dNMS kernel through a configuration path 96.

Figure 9:
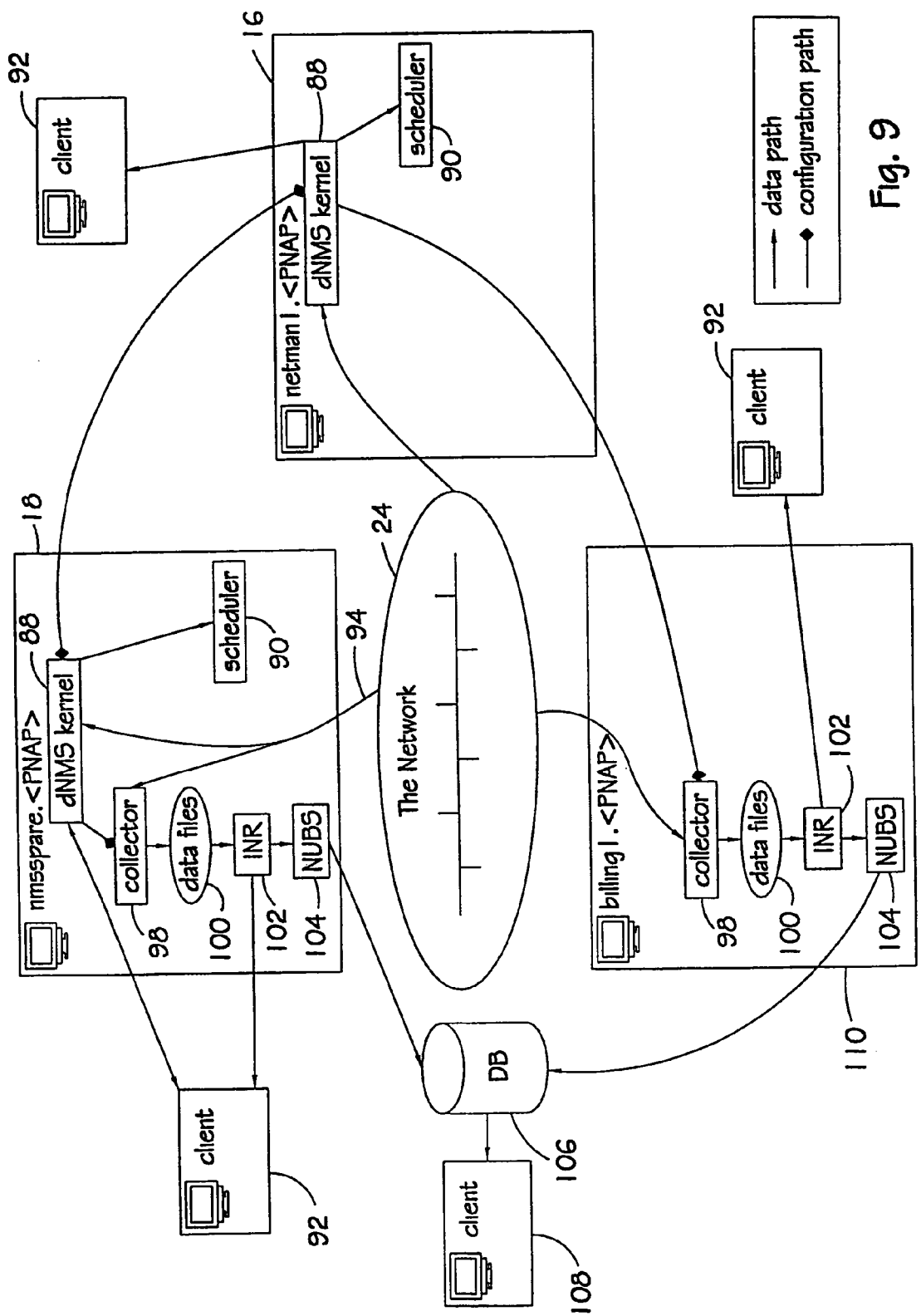
FIG. 9 is a functional block diagram of an alternative embodiment of the remote architecture of FIG. 8.

Optionally, the remotes can include a collector 98, which is also a plug-in service, to which data from the network propagates and is stored in data files 100 for billing or other purposes. Also shown is a module 102 for mining the stored data and a module 104 for collating the mined data into a central database 106 accessible by a client terminal 108 for billing. The details of those components are not described herein as they do not form a part of the invention and are shown solely to indicate additional ways in which the data acquired by a remote can be used. In the event that such additional uses of the data are made, processing overhead of the remotes may increase. In that event, it is preferred to reduce the load on the primary remote by moving the auxiliary data collection functions into a separate remote server 110 as shown in FIG. 9. The primary remote 16 is then dedicated to monitoring network conditions, while server 110 is dedicated to the auxiliary data collection functions. Secondary remote 18 can be configured as before, or unloaded in the same way.

Note that primary 12 and secondary 14 hubs in FIG. 1 would be configured in the same manner as the remotes. Note also that configuration information, as well as state information, propagates bidirectionally between hubs and remotes and between peers (e.g., hub to hub or remote to remote).

Figure 10:
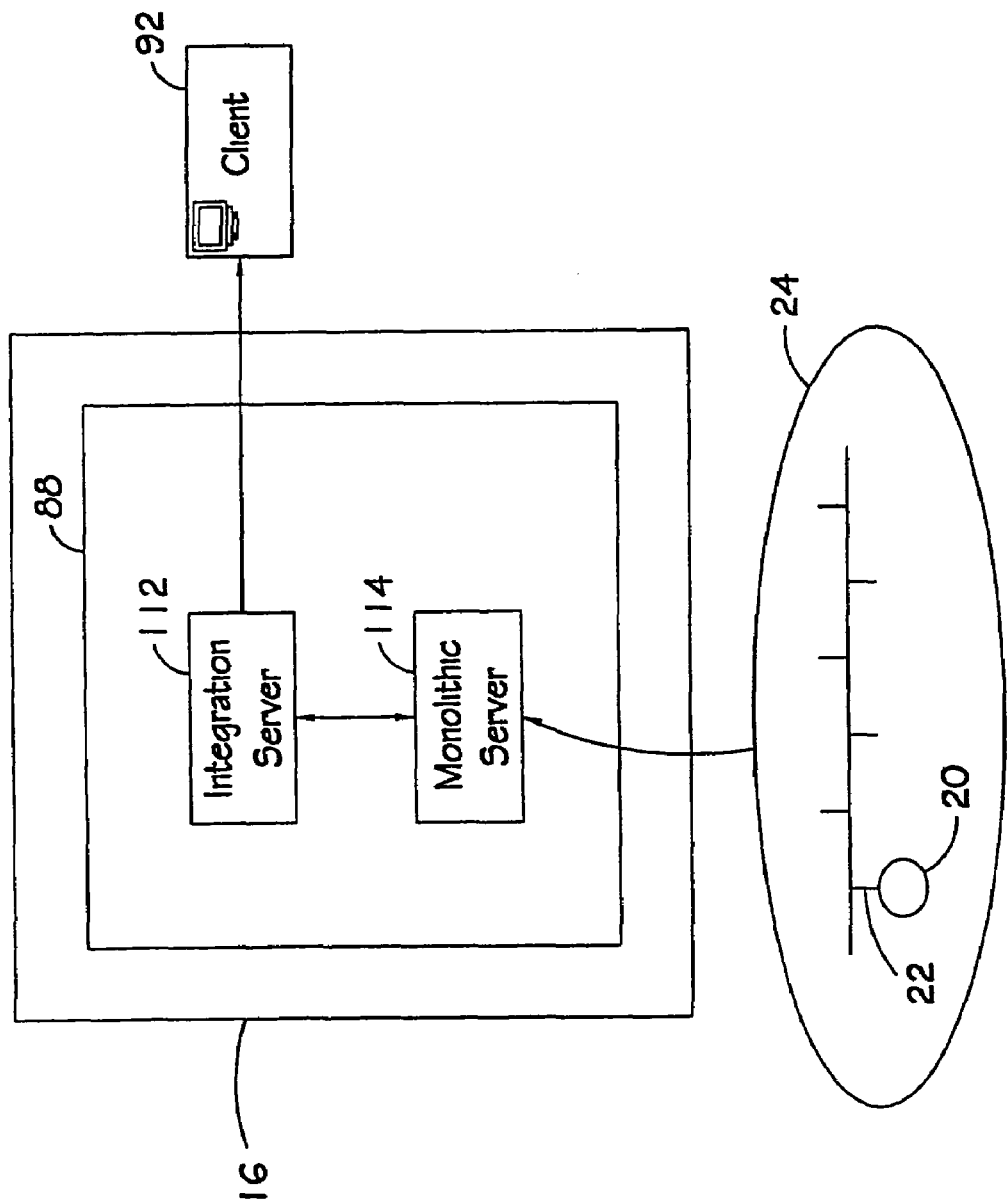
FIG. 10 is a functional block diagram of the dNMS kernel portion of a remote according to the present invention.

As can be seen, therefore, a critical element of a hub and a remote is the dNMS kernel 88. Referring now to FIG. 10, which shows primary remote 16 as an example, the high level architecture of dNMS kernel 88 comprises an integration server 112 and a monolithic server 114. Integration server 112 communicates with client terminal 92 and monolithic server 114 communicates with the network devices connected to network 24.

In the case of a remote, state information relating to the network devices collected by monolithic server 114 is propagated to integration server 112 and then propagated to the integration server in primary hub 12, for example. Furthermore, in the case of a remote, configuration information such as the IP addresses of the network devices to be monitored is entered into integration server 110 from client terminal 92, from which it propagates down to monolithic server 112 as well as propagates up to the integration server in primary hub 12. Alternatively, configuration information can be entered into a hub, in which case the configuration information propagates down to the integration server and the monolithic server in the remotes. While configuration information is entered into a dNMS kernel by a client terminal, state information for the network devices is acquired. In the preferred embodiment of the invention, state information is derived using what will be referred to herein as LTP, which is an acronym developed by the inventors herein. LTP provides for simple real time monitoring of network devices and their interfaces using ICMP, SNMP or a combination thereof, and employs a sliding window to compensate for minor interruptions in Internet links or IP traffic.

In LTP according to the present invention, a polling interval is defined during which each ICMP server sends out a plurality of ICMP echo requests, or pings. While the polling interval and number of pings can vary, in the preferred embodiment ten pings are sent every sixty seconds, with each ping being separated by a one-second interval. The number of pings that are returned is converted to a percentage for that polling interval.

In addition, for that same polling interval, if the node is SNMP-enabled (which may not be the case for servers and other non-router equipment), an SNMP query is sent to the node on which the interface resides. The "operational status" of the interface is queried as to three possible states: "up", "down", and "unknown". An "unknown" operational status means that the SNMP request was never returned and, therefore, the system does not know the status.

Using the percentage of pings returned and the SNMP status, a single number is generated for the polling period. This number is generated by multiplying the percentage of pings returned by a constant that is assigned depending on the result of the SNMP query; namely, a value of one if the query returned "up", a value of zero if the query returned "down", and a value of 0.4 if the query returned "unknown. In essence, the SNMP query returned "up", we simply use the percentage of returned ICMP packets. If the query returned "down", we discard the ICMP information and take the time period as being zero percent. If the query returned "unknown", we assume that there is a routing problem and multiply the percentage ICMP packets by an arbitrary value of four tenths (0.4). For example, if ten out of ten pings are returned during a polling interval, but we were unable to obtain SNMP information for that interface during that time period, the ratio for that time period would be forty percent (40%). Table 1 shows examples of various network conditions, given different SNMP and ICMP values, including the total ratio computed for the time period.

Once the percentage is computed in this manner, the next step is to compute a weighted average of the percentages for current and previous four time periods. This is preferably carried out by with a five element table with a sliding window. The percentage for the current time is inserted in the rightmost (e.g., current period) slot. If the current period slot is not empty, all values in the table are shifted to the left by one slot (i.e., the oldest data is dropped). Therefore, each position in the table represents a different time period's ratio. The leftmost slot contains data that is four polling intervals old and, as the table is transversed to the right, the data is more recent.

Each position in the table is also assigned a weight, which affects the extent to which that position in the table will influence the final percentage; that is, the state of the interface. Higher weights are assigned to the more recent polling intervals, as they are more indicative of the current state. Note, however, that the weights should not be too high; otherwise, the result will be over-notification of problems with the interface. In other words, if the weights are set too high, the normal intermittency in the Internet will result in unnecessary notification. By keeping the weights low, some flapping of the interface is allowed without over notification. Therefore, the weights can vary and are typically set using empirical data.

Table 2 shows an example of a completely filled in sliding window for an interface that, while having an "up" operational state as far as the router is concerned, is dropping a considerable number of ICMP packets. Table 3 shows the relationship between the percentage for the polling period and the "total ratio" once the weights are applied. To arrive at the forty-five percent (45%) total ratio, we take all of the positions in the table into account. The position percentage is multiplied by the weight for all positions to arrive at the resulting percentage for all positions. The resulting percentages are then added and divided by the sum of the weights. Given this total percentage, the final state of the interface is computed. Referring to Table 4, if the percentage is greater than sixty percent (60%), the interface is considered "up". If the percentage is between forty percent (40%) and sixty percent (60%), the state is either intermittent or unknown. However, it is unknown if and only if the last SNMP poll came back as "unknown"; otherwise, it is intermittent. If the ratio is less than forty percent (40%), the interface is "down".

It can be appreciated at this point that a hub and remote each comprise software executing on hardware. The hardware comprises one or more conventional computers and associated peripherals and communications interfaces. The dNMS kernel is a software engine executable on a computer that is integral to a hub or a remote. Preferably, the engine is never modified; instead, for flexibility and scalability, the invention employs "plug-ins" to implement specific functions. A "plug-in" as the term is used herein is a software module that carries a unique file name. Additionally, the only information that need be changed in the dNMS kernel is the configuration information that controls the functioning of a plug-in service, such as LTP described above. The dNMS kernel sends the configuration information, such as device addresses and how often a plug-in should perform a specified function on one or more devices, to the plug-ins and the monolithic server, and the monolithic server monitors the network devices based on the configuration information acquired by the plug-ins.

Monolithic server processing according to the invention can be summarized in terms of nodes (e.g., routers, servers, or topological containers for the same), interfaces (e.g., physical interfaces, IP addresses), services and notifiers. While nodes and interfaces have states, neither a node nor an interface knows how to determine its own state. Nodes and interfaces only have states because they are associated with services that have a state. Therefore, state information is derived from services; namely, an action performed on a node or interface that returns information. A service has a state by definition and is the only object that determines state on its own. An example of a service, as described above, is LTP.

In the present invention, a notifier is a plug-in that routes state information to another service, such as scheduler 90 in FIG. 8. If a service has determined that a change of state has taken place, a notifier is called. Therefore, a notifier is called when the state of a service is changed. In contrast, states of interfaces and nodes are determined by their owned services, but a notifier is not called when the state of an interface or node changes. Note, however, that generally speaking the state change of a service will cause a change of state for the corresponding interface or node.

Note, however, that the state of an interface is defined as the worst state of any of its services, and that the state of a node is defined as the worst state of its interfaces, sub-nodes, and services. This means that a state change of a node or an interface is dictated by a downstream state change, which may not represent all objects on that node or interface. Accordingly, to manage the amount of notifications resulting from state changes on a node or interface, the present invention employs a "toggle notification flag" associated with nodes and interfaces. By setting the flag, an object will be ignored in an upstream state determination. For example, if a node contains multiple interfaces, the state of one or more of the interfaces can be ignored for purposes of determining the state of the node. Notifiers are not called for interfaces or nodes who have their "toggle notification flag" set.

Figure 12:
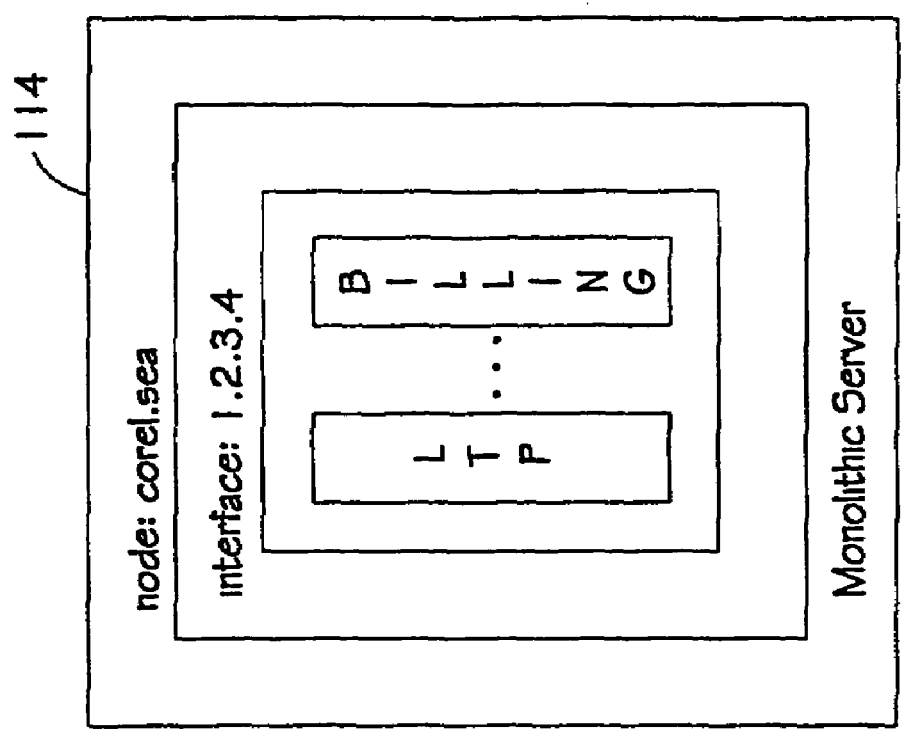
FIG. 12 is a schematic diagram of a monolithic server in the dNMS kernel of FIG. 10.
Figure 11:
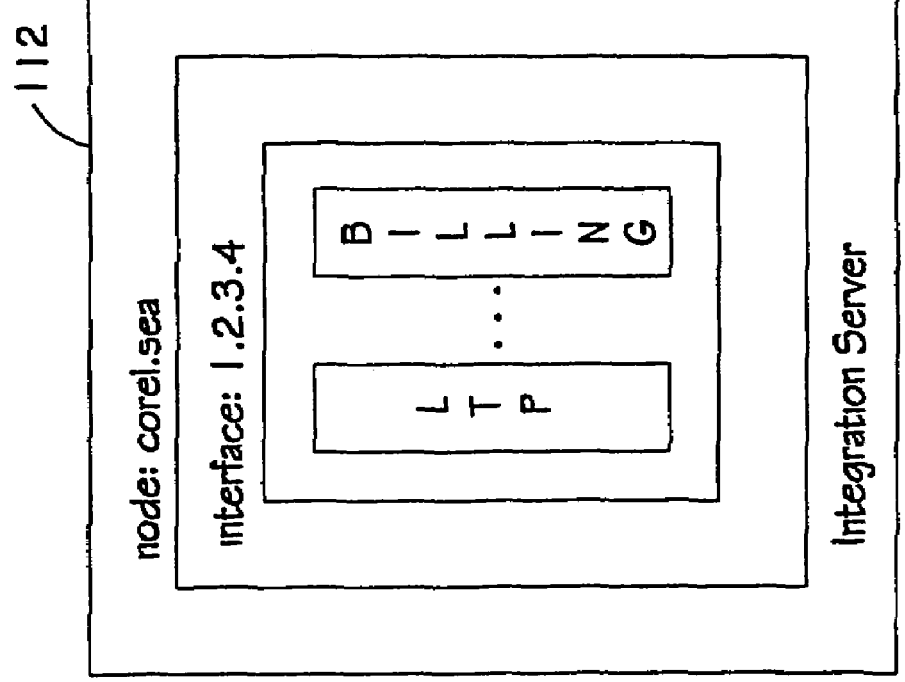
FIG. 11 is a schematic diagram of an integration server in the dNMS kernel of FIG. 10.

Referring now to FIG. 11 and FIG. 12, the preferred embodiment of the lower level architecture of dNMS kernel 88 is shown. At the outset, it should be noted that this architecture is common to all dNMS kernels, whether they reside in a hub or a remote. In FIG. 11, the architecture of the integration server is shown, while the architecture of the monolithic server is shown in FIG. 12. Note that the basic architecture is the same; however, the functions are different.

A primary function of integration server 112 is to manage the configuration information for the network it is configured to represent, such as network 24. An integration server includes "placeholders" for each of the plug-in services, with each placeholder having a unique name that corresponds to the plug-in service that monitors the network. These placeholders are not operational services, however; they only represent configuration information that is passed to operational plug-ins located in monolithic server 114. The integration server manages this configuration information since it is connected to other integration servers in other dNMS kernels and, as discussed previously, configuration information propagates bidirectionally through the system. Therefore, the integration servers manage and route the configurations of all of the monitoring and collection services for the distributed network management system of the invention.

The monolithic server shares the same architecture of the integration server as can be seen in FIG. 12. Here, however, the services are operational and determine the state of downstream objects on the network. Note that the numbers and types of services are not limited. One such service is LTP as described above. Other services include, but are not limited to, monitoring bandwidth thresholding, temperature, power supply status, disk space, and environmental conditions. The system may optionally include one or more utility modules, such as an auto discovery module that knows how a router works and can talk to router to automatically add interfaces. Essentially, any software module that is not in the dNMS kernel itself can be "plugged-in" to the dNMS kernel to provide a service.

Figure 13:
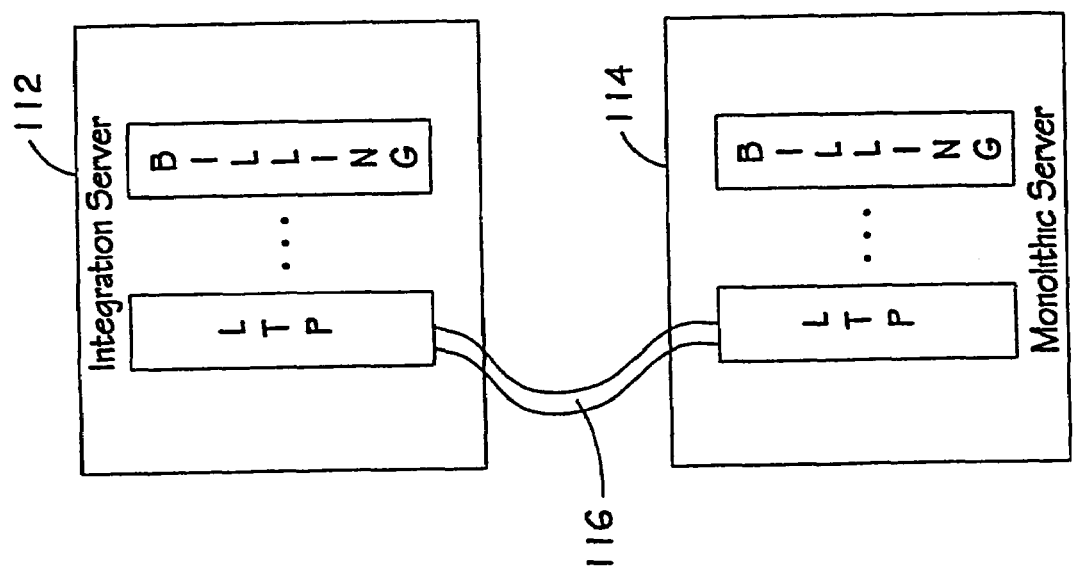
FIG. 13 is a schematic diagram showing data flow between the integration server of FIG. 11 and the monolithic server of FIG. 12.

As indicated previously, each service has a unique identification (e.g., service or file name). Referring to FIG. 13, these identifiers permit the integration server and monolithic server to communicate through a conduit 116, which is an internal bus or other communications link. This allows state information from the monolithic server to be propagated to the corresponding service placeholder in the integration server for further propagation to another dNMS kernel. It also allows for configuration information to be propagated from the integration server to the monolithic server, whether the configuration information originates from the same or a different dNMS kernel (e.g., from the hub or remote in which the dNMS kernel resides, or from another hub or remote).

It will be appreciated that assigning a unique identifier to every service also allows for dNMS kernel to dNMS kernel communication. In addition to every service having a unique identifier, each identifier has a relative timestamp that denotes the last time that the service was changed. For example, when a "change" message such as an "add service" message is transmitted it would indicate that the change was made one-thousand (1000) seconds ago. This helps resolve time-based synchronization problems.

Note also that every attribute type for the various objects has a change message type, such as polling rate, node name, etc. The reason for the time stamping is that, if two changes for the same attribute of the object are received, the most recent is used. More simply, if a more recent type change is received than what is currently recorded, the more recent information is kept instead. Note that the sender of the change does not care how the recipient handles the message, only that it was received.

Figure 14:
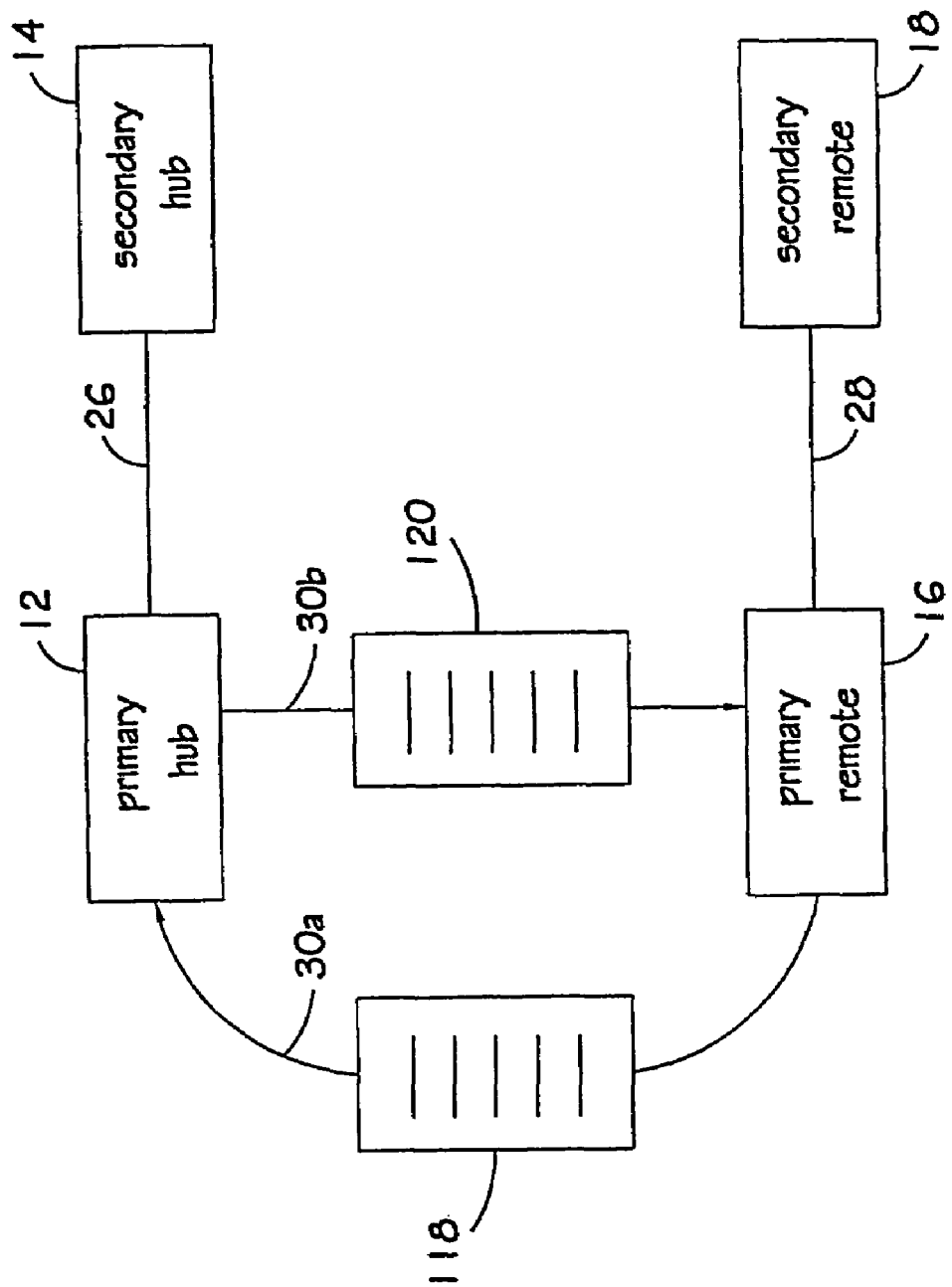
FIG. 14 is a schematic diagram depicting traffic flow between hubs and remotes through queuing according to the invention.

Referring to FIG. 14, the invention also includes a mechanism to control traffic between hubs and remotes. Each time a change message is sent, it is placed into a queue. For example, primary remote 16 sends a message to primary hub 12 through queue 118, and messages from primary hub 12 to primary remote 16 are sent through queue 120. The message is then sent to the appropriate recipient. When the recipient acknowledges receipt, the message is dropped out of the queue. If the recipient does not have sufficient storage to accept the message, it will not send an acknowledgement. In that event, the message will stay in the queue indefinitely until an acknowledgment is received. For example, a remote could keep the message in the queue and not take the message until it has room to receive the message. Note that there are two reasons for a hub or remote to send a change message; when that hub or remote generates the change message, or when propagating a change message for another hub or remote. An example would be where a secondary remote generates a change message. The secondary remote would send it to the primary remote and, in turn the primary remote would propagate it up to a hub.

The use of queues and acknowledgement controls will also keep the hubs from becoming overloaded when all or a part of the system returns from a system failure. Suppose, for example, that a secondary hub comes on line after a failure and thinks that it last received change information from the primary hub thirty (30) seconds ago. Also assume that the primary hub thinks that it last spoke to the secondary hub twelve-hundred (1200) seconds ago. In this instance, the primary hub would send a batch change representing a list of all changes in the past twelve-hundred (1200) seconds to the secondary hub, since that is the oldest timestamp. This can occur in either direction. The queues exist to accommodate batch transactions, rather than real-time transactions.

Another aspect of the invention involves knowing if a peer is operational; for example, a primary hub knowing that its corresponding secondary hub is operational and vice versa In the present invention, this is not determined simply by testing connectivity. Here, all systems connected to each other send "keep alive" signals at specified intervals and look for "keep alive" signals from their peers at specified intervals. For example, every forty (40) seconds a "keep alive" signal is sent from the primary hub to the secondary hub. If a "keep alive" signal is not received by the secondary hub within one-hundred and eighty (180) seconds, the primary hub is considered to be down. Additionally, if a system tries to communicate with its peer, but cannot, the peer is deemed to be down. Other polling periods could be used, but the foregoing empirically have been found to provide the best results.

Also, with regard to the anatomy of a message, each message includes a unique identifier, a timestamp, a change type (e.g., node add, node remove, IP address); message ID, and information specific to the change type (e.g., node name or IP address). To prevent looping in the system, each time a system sends a message it puts a host name in the message and will never send a message to a system whose name is already in the message.

Lastly, it will be appreciated by those skilled in the art that a possible system configuration might involve monitoring a plurality of devices through one physical cable to all devices. In the event that the cable becomes inoperational, each of those devices may be reported as being inoperational. To reduce the need for "redundant" reporting of multiple devices experiencing an outage when the outage is due to a cable or other common device being inoperational, we can collate all devices into one and simply report that the common interface is inoperational.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Examples for filling out one entry in the LTP sliding window

| SINGLE ROW FROM LTP VIEWER | | DESCRIPTION OF SITUATION | ICMP PERCENTAGE RECEIVED | SNMP STATUS | RESULTING PERCENTAGE FOR TIME PERIOD |
|---|---|---|---|---|---|
| −4 min (100%) | up | normal up interface, passing traffic (100% ICMP x 1 SNMP = 100%) | 100% | up (1x) | 100% |
| −4 min (0%) | down | normal down interface, not passing anything (0% ICMP × 0 SNMP = 100%) | 0% | down (0x) | 0% |
| −4 min (40%) | up | major packet loss to interface, but interface is still up (40% ICMP × 1 SNMP = 40%) | 40% | up (1x) | 40% |
| −4 min (36%) | snmp-unknown | interface passing most traffic, but problem gathering snmp info (likely an snmp-renumber issue) (90% ICMP x .4 SNMP = 36%) | 90% | unknown (no response) (.4x) | 36% |
| −4 min (0%) | down | routing problem causing pings to go through anyway, even through interface is down (or, an snmp-renumber issue) (60% ICMP × 0 SNMP = 0%) | 60% | down (0x) | 0% |
| −4 min (100%) | undefined | normal pings on an interface with no SNMP (web server, etc.), (70% ICMP = 70%) | 70% | — | 70% |
| −4 min (−) | up | snmp-only monitoring of un-numbered interface, no ICMP status at all (1 SNMP = 100%) | — | up (1x) | 100% |

TABLE 2

Example output for entire window of data

| TIME PERIOD | PERCENTAGE | SNMP STATE | WEIGHT |
|---|---|---|---|
| −4 min | 33% | up | 2x |
| −3 min | 33% | up | 2x |
| −2 min | 0% | up | 3x |
| −1 min | 100% | up | 3x |
| 0 min | 50% | up | 4x |

TABLE 3

Total ratio calculation for LTP view in Table 2

| PERCENTAGE RECEIVED FOR TIME PERIOD | WEIGHT | RESULTING PERCENTAGE |
|---|---|---|
| 33% | 2x | +66% |
| 33% | 2x | +66% |
| 0% | 3x | +0% |

TABLE 3-continued

Total ratio calculation for LTP view in Table 2

| PERCENTAGE RECEIVED FOR TIME PERIOD | WEIGHT | RESULTING PERCENTAGE |
|---|---|---|
| 100% | 3x | +300% |
| 50% | 4x | +200% |
| | | 632%/14 = 45% |

TABLE 4

Mapping of total ratio percentage to final state of LTP

| TOTAL RATIO LEVEL | RESULTING STATE |
|---|---|
| ratio < 40 | down |
| 40 < ratio < 60 | unknown or intermittent |
| ratio > 60 | up |

What is claimed is:

1. A distributed network management system, comprising:
   a selected network hub server for communicating with a plurality of remote network servers or with at least one network device;
   each of said plurality of remote network servers for communicating with said at least one network device and said selected network hub server wherein each of said remote network servers derives state information from said network device by:
   polling said at least one network device at a polling interval, wherein polling said at least one network device comprises:
      sending a plurality of pings to an interface address on said at least one network device during said polling interval; and
      monitoring a number of pings returned from said at least one network device and calculating a percentage based on the number of pings sent and said number of pings returned;
   sending a query related to operational status to said at least one network device;
   receiving a response regarding said operational status from said at least one network device, wherein receiving a response regarding said operational status from said at least one network device comprises:
      receiving a response indicating whether said operational status is "up", "down", or "unknown"; and
      generating a status percentage for the polling interval by multiplying the percentage pings returned by a constant value associated with said operational status, said constant value comprising a first value if the operational status is "up", a second value if the operational status is "down", and a third value if the operational status is "unknown";
   computing a weighted average over at least one said polling interval using results of said polling and said responses received from said at least one network device, wherein the weighted average is a representation of the state of said network device and wherein computing the weighted average comprises:
      computing the weighted average of the status percentage for a current and at least one previous polling interval and determining the state of said at least one network device from the weighted average; and storing said weighted average.

2. The system as recited in claim 1, wherein computing the weighted average further comprises:
   computing the weighted averaged of the status percentage for a current and the previous four polling intervals and determining the state of said at least one network device from the weighted average.

3. The system as recited in claim 1, wherein said selected network hub server derives state information from said at least one network device when said at least one remote network server is inoperable by:
   polling said at least one network device at the polling interval, wherein polling said at least one network device by said selected network hub server comprises:
      sending a plurality of pings to an interface address on said at least one network device during said polling interval; and
      monitoring a number of pings returned from said at least one network device and calculating a percentage based on the number of pings sent and said number of pings returned;
   sending a query related to operational status to said at least one network device;
   receiving a response regarding said operational status from said at least one network device, wherein receiving a response regarding said operational status from said at least one network device comprises:
      receiving a response indicating whether said operational status is "up", "down", or "unknown"; and
      generating a status percentage for the polling interval by multiplying the percentage pings returned by a constant value associated with said operational status, said constant value comprising a first value if the operational status is "up", a second value if the operational status is "down", and a third value if the operational status is "unknown";
   computing the weighted average over at least one polling interval using results of said polling and said responses received from said at least one network device when said remote network server communicating with said at least one network device is inoperable, wherein the weighted average is a representation of the state of said network device and wherein computing the weighted average comprises:
      computing the weighted average of the status percentage for a current and at least one previous polling interval and determining the state of said at least one network device from the weighted average; and storing said weighted average.

4. The system as recited in claim 3, wherein computing the weighted average comprises:
   computing a weighted average of the status percentage for a current and the previous four polling intervals and determining the state of said at least one network device from the weighted average.

5. The system recited in claim 1, wherein said remote network server computes a weighted average by assigning a weight value to the status percentage to each of the previous four polling intervals, wherein the assigned weight is higher for the most recent polling interval and lower for the least recent polling interval.

6. A computer readable storage medium having a program for generating a source code object, the program comprising logic for executing an LTP paradigm, said LTP paradigm comprising the steps of:
   defining a polling interval for at least one network device;
   sending a plurality of pings to an interface address on said at least one network device during said polling interval;
   monitoring a number of pings returned from said at least one network device and calculating a percentage based on the number of pings sent and said number of pings returned;
   sending a query to said at least one network device and determining operational status of said at least one network device from said query based on a response from said at least one network device, said operational status comprising "up", "down", and "unknown";
   using the calculated percentage of pings returned and said status response, generating a status percentage for the polling period by multiplying the percentage pings returned by a constant value associated with said operational status, said constant value comprising a first value if the operational status is "up", a second value if the operational status is "down", and a third value if the operational status is "unknown"; and computing a weighted average of the status percentages for current and previous four polling periods and determining the state of said at least one network device from the weighted average.

7. A system for deriving state information from a network device, comprising:
   (a) a computer; and
   (b) programming associated with said computer for carrying out the operations of
     (i) defining a polling interval;
     (ii) sending, from an ICMP server, a plurality of pings to an interface address on said network device during said polling interval;
     (iii) monitoring the number of pings returned from said network device and converting said number to a percentage based on the number of pings sent;
     (iv) sending an SNMP query to said network device and determining operational status of said network device from said SNMP query, said operational status comprising "up", "down", and "unknown";
     (v) using the percentage of pings returned and the SNMP status, generating a status percentage for the polling period by multiplying the percentage pings returned by a constant value associated with said operational status, said constant value comprising a first value if the operational status is "up", a second value if the operational status is "down", and a third value if the operational status is "unknown"; and
     (vi) computing a weighted average of the status percentages for current and previous four polling periods and determining the state of the network device from the weighted average.

8. A method for deriving state information, comprising:
   polling at least one network device at a polling interval, wherein polling said at least one network device comprises:
     sending a plurality of pings to an interface address on each said at least one network device during said polling interval; and
     monitoring a number of pings returned from said at least one network device and calculating a percentage based on the number of pings sent and said number returned;
   sending a query related to operational status to said at least one network device;
   receiving a response regarding said operational status from said at least one network device, wherein receiving a response regarding said operational status from said at least one network device comprises:
     receiving a response indicating whether said operational status is "up", "down", or "unknown"; and
     generating a status percentage for the polling interval by multiplying the percentage pings returned by a constant value associated with said operational status, said constant value comprising a first value if the operational status is "up", a second value if the operational status is "down", and a third value if the operational status is "unknown";
   computing a weighted average over at least one said polling interval using results of said polling and said responses received from said at least one network device, wherein the weighted average is a representation of the state of said at least one network device and wherein computing weighted average comprises:
     computing the weighted average of the status percentage for at least one previous polling interval and determining the state of said at least one network device from the weighted average; and
   storing said weighted average.

9. The method as recited in claim 8, wherein computing the weighted average further comprises:
   computing the weighted average of the status percentage for a current and the previous four polling intervals and determining the state of said at least one network device from the weighted average.

10. The method recited in claim 8, wherein said computing a weighted average comprises assigning a weight value to the status percentage to each of the previous four polling intervals, wherein the assigned weight is higher for the most recent polling interval and lower for the least recent polling interval.

11. The method as recited in claim 8, wherein said deriving state information is performed by a remote network server.

12. The method as recited in claim 8, wherein said deriving state information is performed by a network hub server.

13. A method for deriving state information from a network device, comprising:
   (a) defining a polling interval;
   (b) sending, from an ICMP server, a plurality of pings to an interface address on said network device during said polling interval;
   (c) monitoring the number of pings returned from said network device and converting said number to a percentage based on the number of pings sent;
   (d) sending an SNMP query to said network device and determining operational status of said network device from said SNMP query, said operational status comprising "up", "down", and "unknown";
   (e) using the percentage of pings returned and the SNMP status, generating a status percentage for the polling period by multiplying the percentage pings returned by a constant value associated with said operational status, said constant value comprising a first value if the operational status is "up", a second value if the operational status is "down", and a third value if the operational status is "unknown"; and
   (f) computing a weighted average of the status percentages for current and previous four polling periods and determining the state of the network device from the weighted average.

* * * * *